United States Patent
Rajendiran et al.

(10) Patent No.: US 10,652,933 B2
(45) Date of Patent: May 12, 2020

(54) SYSTEM, METHOD AND APPARATUS FOR MONITORING WIRELESS COMMUNICATIONS

(71) Applicant: Zebra Technologies Corporation, Lincolnshire, IL (US)

(72) Inventors: Subramani Rajendiran, Bangalore (IN); Ohad Shatil, Dunwoody, GA (US); Satish Shivarudrappa, Bangalore (IN); Daniel Franklin, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/044,725

(22) Filed: Jul. 25, 2018

(65) Prior Publication Data
US 2020/0037372 A1    Jan. 30, 2020

(51) Int. Cl.
*H04M 11/00* (2006.01)
*H04W 76/10* (2018.01)
*H04W 24/06* (2009.01)
*H04W 56/00* (2009.01)
*H04W 80/02* (2009.01)

(52) U.S. Cl.
CPC ......... *H04W 76/10* (2018.02); *H04W 24/06* (2013.01); *H04W 56/001* (2013.01); *H04W 80/02* (2013.01)

(58) Field of Classification Search
CPC ..... H04W 24/08; H04W 80/10; H04W 36/18; H04W 56/0015; H04W 56/002; H04W 84/18; H04Q 7/20; H04Q 1/20; H04Q 11/045; H04M 11/00; H04L 67/14; H04L 67/147; H04L 1/242; H04L 1/244; H04L 12/26; H04L 12/2697; H04L 43/50; H04J 2203/0062
See application file for complete search history.

(56) References Cited

U.S. PATENT DOCUMENTS

| | | | | |
|---|---|---|---|---|
| 9,078,153 B1 * | 7/2015 | Schelstraete | .......... | H04W 88/08 |
| 2007/0076664 A1 * | 4/2007 | An | .......... | H04W 80/10 |
| | | | | 370/331 |
| 2007/0207770 A1 * | 9/2007 | Ikaheimo | .......... | H04W 24/08 |
| | | | | 455/403 |
| 2010/0246416 A1 * | 9/2010 | Sinha | .......... | H04W 24/06 |
| | | | | 370/250 |
| 2013/0142050 A1 * | 6/2013 | Luna | .......... | H04W 4/18 |
| | | | | 370/241 |
| 2014/0029603 A1 * | 1/2014 | Nomura | .......... | H04W 56/002 |
| | | | | 370/350 |

* cited by examiner

*Primary Examiner* — Jung Liu (57) ABSTRACT

A system for monitoring wireless communications in a client device includes a wireless communications interface, including: an analyzer; a monitoring controller coupled to the analyzer; an operational controller of the client device coupled to the wireless communications interface, the operational controller configured to: control the wireless communications interface to establish a wireless connection with an access point according to a set of connection parameters including a channel identifier; and transmit the set of connection parameters to the monitoring controller; the monitoring controller configured, responsive to receiving the connection parameters from the operational controller, to: monitor a channel corresponding to the channel identifier to obtain a plurality of frames transmitted over the channel; and provide the plurality of frames to the analyzer.

19 Claims, 7 Drawing Sheets

SYSTEM, METHOD AND APPARATUS FOR MONITORING WIRELESS COMMUNICATIONS

BACKGROUND

Wireless computing devices are deployed in a wide variety of environments. Such devices may encounter reduced wireless communications performance, connectivity problems, and the like under certain conditions. Attempts to detect and diagnose such reduced performance for a given device may include the collection of communications data associated with the device. Some techniques for collecting such data, however, collect incomplete data (e.g. in the case of discrete sniffer devices deployed in the same environment), or further compromise the performance of the device under investigation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a system for monitoring wireless communications in a client device includes a wireless communications interface, including: an analyzer; a monitoring controller coupled to the analyzer; an operational controller of the client device coupled to the wireless communications interface, the operational controller configured to: control the wireless communications interface to establish a wireless connection with an access point according to a set of connection parameters including a channel identifier; and transmit the set of connection parameters to the monitoring controller; the monitoring controller configured, responsive to receiving the connection parameters from the operational controller, to: monitor a channel corresponding to the channel identifier to obtain a plurality of frames transmitted over the channel; and provide the plurality of frames to the analyzer.

Additional examples disclosed herein are directed to a method for monitoring wireless communications in a client device having a wireless communications interface, comprising: at an operational controller of the client device coupled to the wireless communications interface, controlling the wireless communications interface to establish a wireless connection with an access point according to a set of connection parameters including a channel identifier; transmitting the set of connection parameters from the operational controller to a monitoring controller coupled to an analyzer; at the monitoring controller, responsive to receiving the connection parameters from the operational controller, monitoring a channel corresponding to the channel identifier to obtain a plurality of frames transmitted over the channel; and providing the plurality of frames from the monitoring controller to the analyzer.

Figure 1:
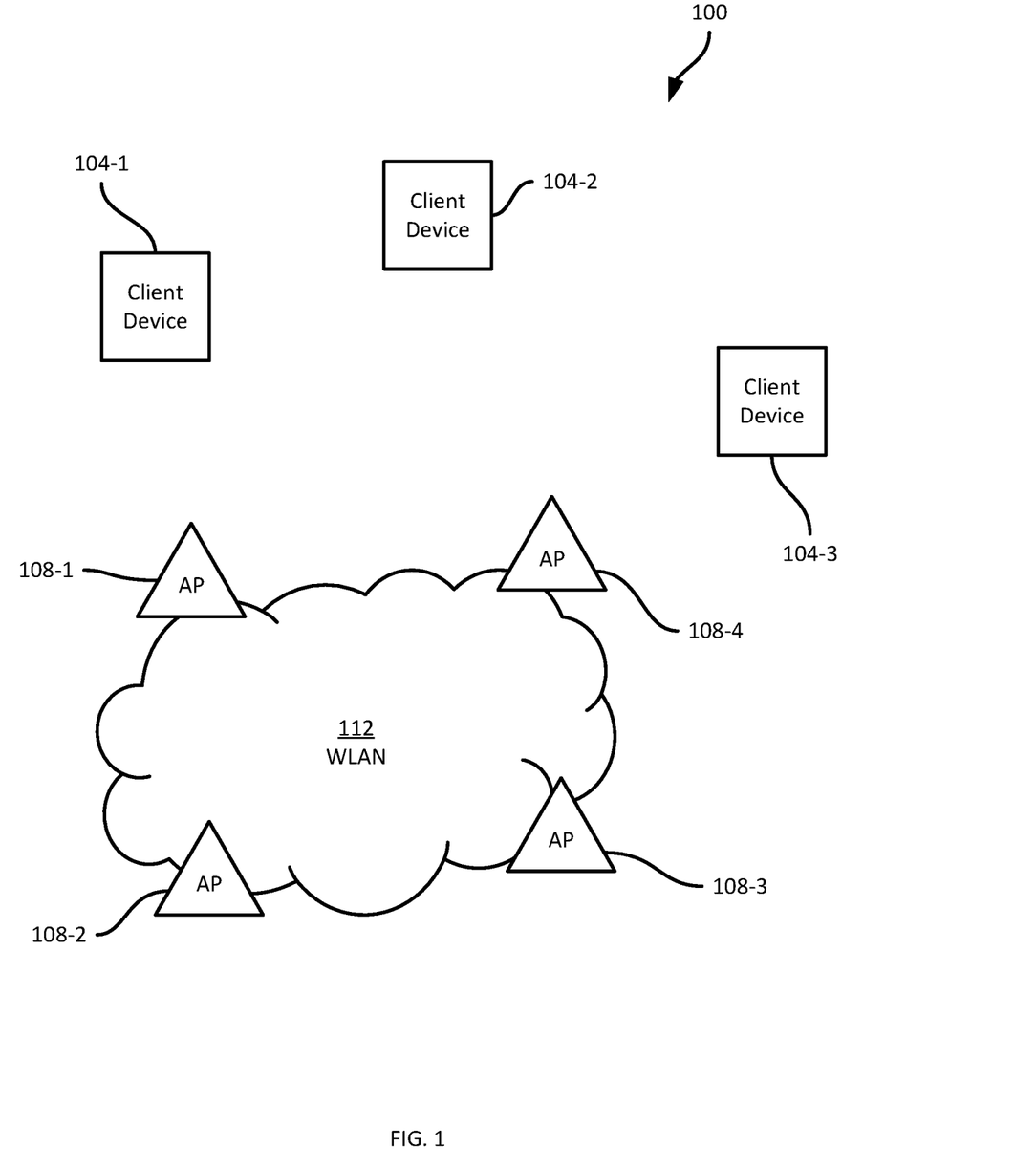
FIG. 1 is a block diagram of a communication system.

FIG. 1 depicts a wireless communications system 100, including a plurality of wireless client devices 104, of which three example devices 104-1, 104-2 and 104-3 are shown (collectively referred to as client devices 104, and generically referred to as a client device 104; this nomenclature may also be used elsewhere herein). The system 100 can include fewer client devices (e.g., two client devices 104), or a greater number of client devices than the three devices 104 illustrated in FIG. 1.

Each client device 104 is a wireless computing device, and may be mobile (e.g., portable) or stationary (e.g. fixed to a support surface). Accordingly, each client device 104 includes any of a smart phone, a laptop computer, a desktop computer, a tablet computer, a handheld data capture device such as a barcode scanner, and the like. The client devices 104, as will be discussed in greater detail, below, each include communication interfaces enabling the devices 104 to establish communication sessions with other computing devices.

Such communication sessions can be established, for example, between a client device 104 and an access point 108 (e.g. a wireless router) of a wireless local-area network (WLAN) 112, such as a Wi-Fi network operating according to a suitable one of the IEEE 802.11 family of wireless protocols. In the example of FIG. 1, the WLAN 112 is implemented by four access points 108-1, 108-2, 108-3 and 108-4. In other examples, additional WLANs may also be implemented in the system 100, and the WLAN 112 may be implemented by fewer access points 108 than illustrated, or by a greater number of access points 108 than illustrated. In some examples, the access points 108 are components of one or more wide-area networks (e.g. a cellular network) rather than of the WLAN 112. The WLAN 112 may also be connected to such a wide area network (not shown).

Each of the devices 104 is enabled to establish a connection with an access point 108 of the WLAN 112, for example to communicate with other computing devices connected to the WLAN (including, but not limited to, the other devices 104). The above-mentioned connections may suffer from reduced quality (e.g. reduced connection range, reduced connection bandwidth and the like) for any of a wide variety of reasons. Potential sources of reduced connection performance include physical obstructions in the environment in which the system 100 is deployed (e.g. metal shelves in a warehouse), congestion on one or more channels employed by the devices 104 and access points 108, changes in physical configuration (e.g. shape, orientation and the like) of the devices 104 and access points 108, operational errors at the devices 104 and access points 108, and the like.

The system 100 includes certain components, to be discussed in greater detail below, to enable monitoring of connections established between the devices 104 and the access points 108 to collect data which may be used to detect and/or diagnose performance reductions such as those mentioned above.

Figure 2A:
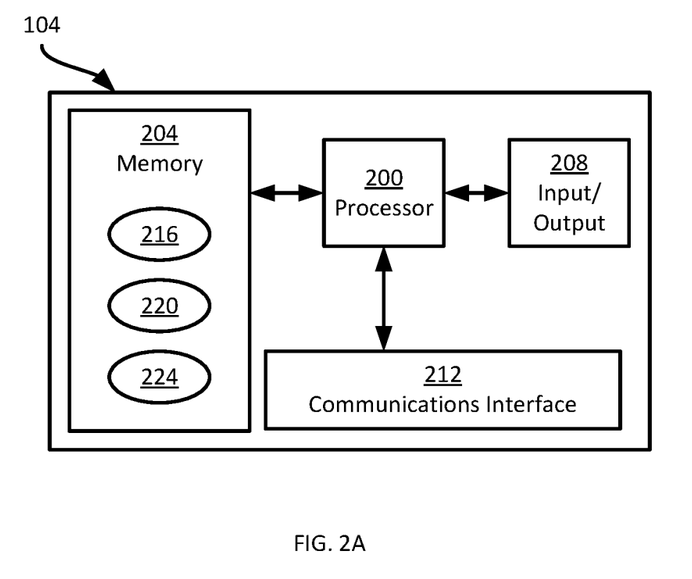
FIG. 2A is a block diagram of certain internal hardware components of the client devices of FIG. 1.

Referring to FIG. 2, certain internal components of a device 104 are illustrated. Each of the client devices 104 in the system 100 includes the components shown in FIG. 2A, although the client devices 104 may have heterogeneous form factors and implementations of the components shown.

The client device 104 includes a central processing unit (CPU), also referred to as a processor 200, interconnected with a non-transitory computer readable storage medium, such as a memory 204. The memory 204 includes any suitable combination of volatile (e.g. Random Access Memory (RAM)) and non-volatile (e.g. read only memory (ROM), Electrically Erasable Programmable Read Only Memory (EEPROM), flash) memory. The processor 200 and the memory 204 each comprise one or more integrated circuits (ICs).

The device 104 also includes at least one input device, and at least one output device, illustrated in FIG. 2A as an input/output device 208 interconnected with the processor 200. The input device includes any suitable one, or any suitable combination of, a touch screen, a keypad, a trigger (e.g. to initiate the performance of any encoding task), a keyboard, a mouse, and the like. The output device includes any suitable one, or any suitable combination of a display (e.g., integrated with the above-mentioned touch screen), a speaker, and the like. The input/output device 208 is configured to receive input and provide data representative of the received input to the processor 200, and to receive output from the processor 200 and present the output, e.g. via the emission of sound from the speaker, the rendering of visual indications on the display, and the like.

The client device 104 also includes a communications interface 212, enabling the client device 104 to exchange data with other computing devices, including the access points 108, as well as other client devices 104 (e.g. via direct connections bypassing the WLAN 112). The communications interface 212 includes a suitable combination of transceiver hardware, such as antenna elements or arrays of antenna elements, analog and digital processing circuitry (e.g. one or more of a radio processor and a digital baseband processor), and the like. The communications interface 212 may, for example, be implemented as a system-on-a-chip (SoC) within the device 104. Such as SoC can include one or more processors and associated memory distinct from the processor 200 and memory 204 mentioned above.

The components of the client device 104 are interconnected by communication buses (not shown), and powered by a battery or other power source, over the above-mentioned communication buses or by distinct power buses (not shown).

The memory 204 of the client device 104 stores a plurality of applications, each including a plurality of computer readable instructions executable by the processor 200. The execution of the above-mentioned instructions by the processor 200 causes the client device 104 to implement certain functionality, as discussed herein. The applications are therefore said to be configured to perform the functionality in the discussion below. In the present example, the memory 204 of the device 104 stores an operational communications control application 216, also referred to herein as the application 216. The client device 104 is configured, via execution of the application 216 by the processor 200, to control the communications interface 212 to establish wireless connections with other devices (e.g. the access points 108) and to exchange data over such connections.

The memory 204 also stores a monitoring communications control application 220. As will be discussed below, the application 220 is configured to monitor the connections established by the application 216, for example by capturing some or all of the data exchanged over such connections. The application 220 is configured to pass the captured data to an analyzer application 224 stored in the memory 204 for execution by the processor 200. The application 224 is configured to process the captured data to detect and/or diagnose performance reductions in the connections, generate alerts, and the like. Additionally, the applications 216 and 220 implement functionality enabling the application 220 to obtain connection parameters from the application 216 and thereby monitor connections over which the device 104 exchanges data.

The applications 216 and 220 implement distinct logical entities enabled to access communication channels via the communications interface 212. As will be discussed below, the applications 216 and 220 each implement distinct media access control (MAC) layers in connection with the communications interface 212, as well as distinct application layers configured to interact with the above-mentioned MAC layers. In the present example, in which the applications 216 and 220 reside on a common device 104, the two distinct MAC layers are addressable via the same MAC address enabling communication with other computing devices via the communications interface 212.

As will be discussed below in greater detail, however, only the application 216 is configured to establish connections with other computing devices to exchange data with such devices. The application 220, in contrast, is configured as a listener (which may also be referred to as a sniffer) to monitor the above-mentioned connections, without communicating over them.

Figure 2B:
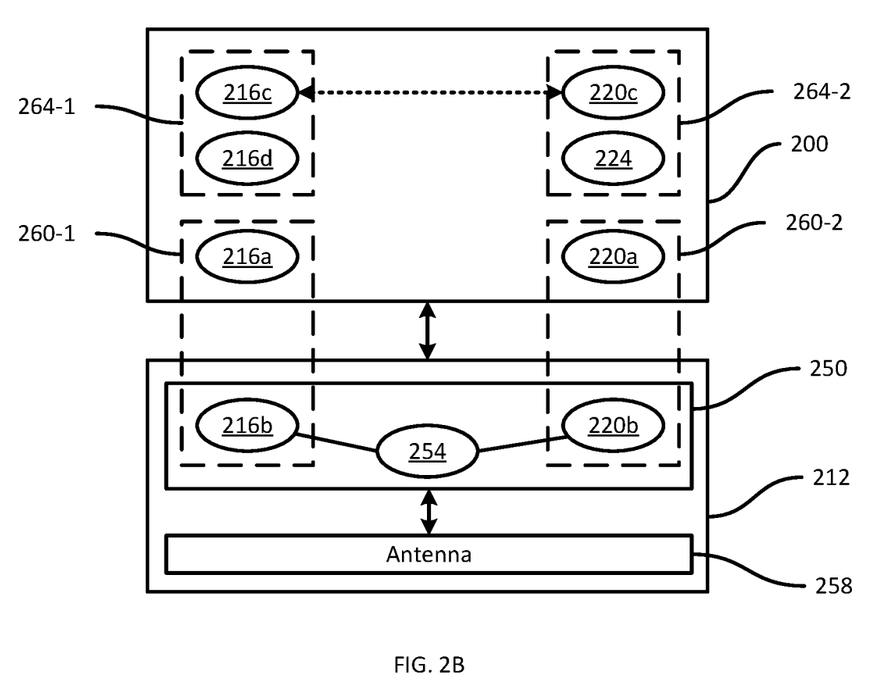
FIG. 2B is a block diagram of certain internal components of the client device of FIG. 2A.

Various deployments of the functionality provided by the applications 216 and 220 are contemplated. FIG. 2B illustrates one such example deployment. As shown in FIG. 2B, the applications 216 and 220 can be divided into first application components 216a and 220a (e.g. device driver software) executed by the processor 200 (e.g. having been loaded into the processor 200 from the memory 204, not shown in FIG. 2B), and second application components 216b and 220b (e.g. firmware) executed by a controller 250 of the communications interface 212 (e.g. a controller of the above-mentioned SoC). The controller 250 may also execute a transceiver application 254 configured to directly control an antenna component 258 of the communications interface 212. The second components 216b and 220b may, for example, be configured to obtain incoming signals and provide outgoing signals to the application 254. In other words, the application 254 implements a PHY layer, while each pair of applications 216a/216b and 220a/220b implements a distinct MAC layer. That is, the applications 216a and 216b implement a first MAC layer 260-1, while the applications 220a and 220b implement a second MAC layer 260-2. The first MAC layer 260-1 is also referred to as the operational MAC layer, as the device 104 employs the first MAC layer 260-1 to communicate with other computing devices. The second MAC layer 260-2, meanwhile, is also referred to as the monitoring MAC layer and is used to collect of data exchanged with such other devices via the first MAC layer 260-1 for analysis.

The applications 216 and 220 also each include a third component 216c, 220c. Further, the application 216 includes a fourth component 216d. The components 216c and 216d together define an application layer 264-1 associated with the MAC layer 260-1, while the component 220c, together with the analyzer application 224, define an application layer 264-2 associated with the MAC layer 260-2. The component 216d of the application 216 is a control component configured to place the MAC layer 260-1 in a connected mode, permitting the MAC layer 260-1 to establish connections with other devices via the communications interface 212 (i.e. configuring the layer 260-1 as an operational MAC layer, rather than a monitoring MAC layer). The components 216c and 220c, as illustrated by the dotted line extending between them, are synchronization components configured to exchange configuration data, as will be described below in greater detail, permitting the application 220 to collect data for analysis by the analyzer application 224 according to operational parameters of the operational MAC layer 260-1. Various other implementations are also contemplated for the applications 216 and 220. For example, the synchronization components 216c and 220c may be implemented in the MAC layers 260 rather than the application layers 264 in other embodiments.

As will be apparent to those skilled in the art, deployments of the applications 216 and 220 other than those shown in FIGS. 2A and 2B may also be employed. For example, the processor 200 or the controller 250, as configured by the execution of the applications 216 and 220 (or components thereof as noted above), can be implemented as one or more specifically-configured hardware elements, such as field-programmable gate arrays (FPGAs) and/or application-specific integrated circuits (ASICs). In the discussion below, therefore, the application 216 will be referred to as an operational communications controller 216, or simply as an operational controller 216. The operational controller 216, in other words, represents a suitable combination of hardware components and software executed by such hardware components for implementing the operational MAC layer 260-1. Similarly, the application 220 will be referred to as a monitoring communications controller 220, or simply as a monitoring controller 220.

Figure 3:
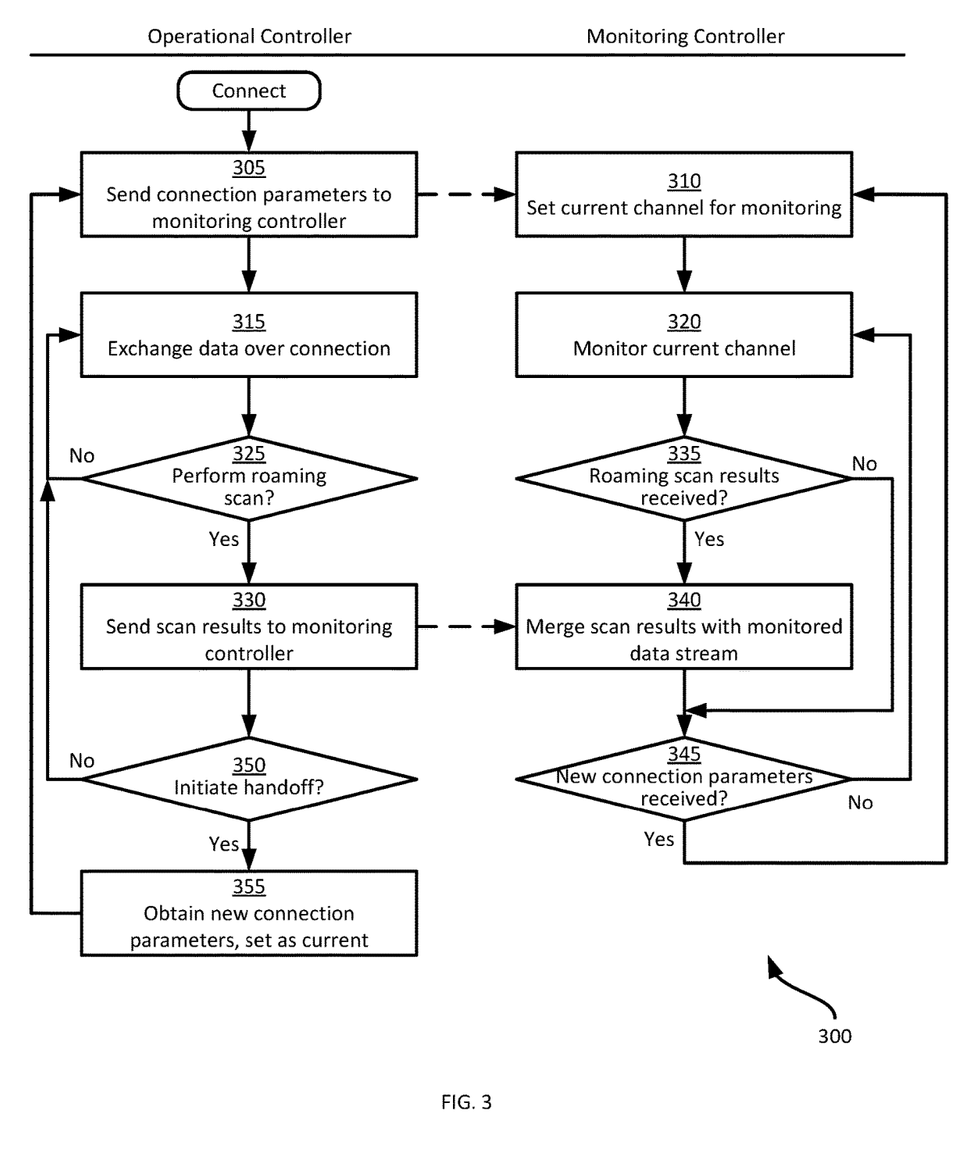
FIG. 3 is a flowchart of a method for monitoring wireless communications.

Turning now to FIG. 3, the functionality of the operational controller 216 and the monitoring controller 220 will be described in greater detail. FIG. 3 depicts a method 300 of monitoring wireless communications. The method 300 will be described in conjunction with its performance in the system 100, and in particular by the operational controller 216 and the monitoring controller 220 for monitoring the wireless communications of a device 104 (e.g. the device 104-1, although it will be understood that the method 300 may be performed with respect to any device 104 in the system 100).

At block 305, the operational controller 216 is configured, responsive to establishing a connection with an access point 108, to send connection parameters defining the connection to the monitoring controller 220. The connection parameters include a channel identifier indicating which of a plurality of available channels (e.g. those defined according to a suitable one of the 802.11 family of protocols) is employed for the connection. The connection parameters can also include an identifier of the WLAN 112, such as a service set identifier (SSID), and an identifier of the specific access point 108 with which the connection was established, such as a basic service set identifier (BSSID, typically a MAC address) corresponding to the access point 108. The connection parameters can also include one or more encryption keys established for the connection, such as a pairwise transient key (PTK), a group temporal key (GTK) or the like.

Transmission of the connection parameters from the operational controller 216 to the monitoring controller 220 can be accomplished via any suitable communications mechanism, such as via one or more inter-integrated circuit (I2C) interface within the device 104, an inter-process mechanism provided by an operating system of the device 104, and the like. The connection parameters from the operational controller 216 to the monitoring controller 220 can be contained in a message containing an indicator that the message relates to a newly established connection (e.g. "Start" or the like).

Figure 4:
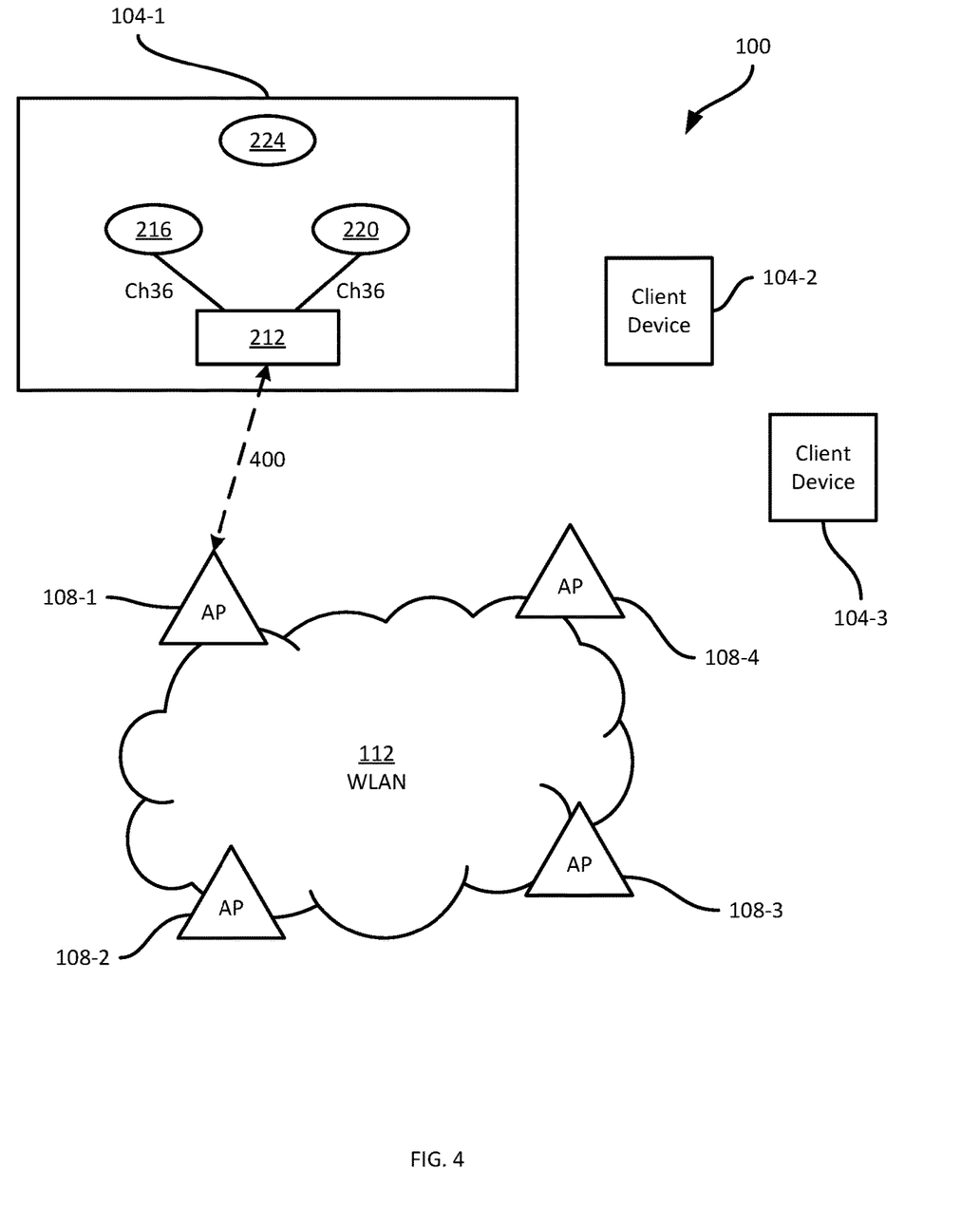
FIG. 4 depicts the system of FIG. 1 following performances of blocks 305 and 310 of the method of FIG. 3.

At block 310, having received the connection parameters, the monitoring controller 220 is configured to set a current channel for monitoring. The monitoring controller 220 can be, for example, configured to instruct the communications interface 212 to pass any frames received on the current channel to the monitoring controller 220. Referring to FIG. 4, the system 100 is shown following establishment of a connection 400 between the device 104-1 and the access point 108-1 at block 305, and the transmission of connection parameters from the operational controller 216 to the monitoring controller 220. In particular, it is assumed that the connection 400 is established using the channel identified as "Ch36". The operational controller 216 therefore interacts with the communications interface 212 to send data over the connection 400, and to receive any transmissions detected by the communications interface 212 on the channel Ch36. The monitoring controller 220 also interacts with the communications interface 212 to receive any transmissions detected by the communications interface 212 on the channel Ch36. For example, the PHY components of the communications interface 212 can be configured, having detected and digitized a signal on the channel Ch36, to send the digitized signal to both the controllers 216 and 220.

Returning to FIG. 3, at block 315 the operational controller 216 is configured to control the communications interface 212 to communicate over the connection corresponding to the parameters sent at block 305 (e.g. the connection 400 in the present embodiment). As will be apparent to those skilled in the art, the operational controller 216 is configured, during the performance of block 315, to receive frames of data detected by the communications interface 212 on the current channel, whether or not such frames are addressed to the operational controller 216. The operational controller 216 is configured to discard any frames that are not addressed to the operational controller 216 (e.g. that do not contain the MAC address of the operational controller 216), and to process frames that are addressed to the operational controller 216. Processing of frames that are addressed to the operational controller 216 is not discussed in detail herein, but can include passing the frames to other components of the device 104, for example for application-layer processing.

At block 320, the monitoring controller 220 is configured, simultaneously with the performance of block 315 by the operational controller 216, to monitor the channel set at block 310. More specifically, the monitoring controller 220 is configured to receive any frames detected by the communications interface 212 on the current channel, and to pass all such frames to the analyzer 224. Prior to passing a frame to the analyzer 224, the monitoring controller 220 can be configured to decrypt the frame using the encryption key(s) received at block 310.

Figure 5A:
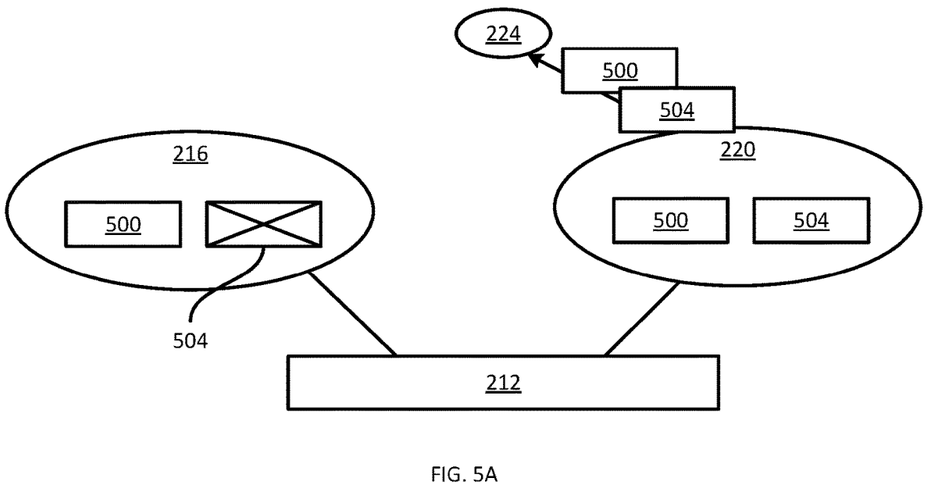
FIG. 5A depicts performances of blocks 315 and 320 of the method of FIG. 3.

Turning to FIG. 5A, an illustration of blocks 315 and 320 is shown in the device 104-1 following establishment of the connection 400 as shown in FIG. 4. In particular, the communications interface 212 has detected a first frame 500 addressed to the operational controller 216, and a second frame 504 addressed to a separate operational controller (e.g. corresponding to a different device 104). The controllers 216 and 220 both receive the frames 500 and 504 from the communications interface 212. At block 315, however, the operational controller 216 is configured to discard the frame 504, as the frame 504 is not addressed to the controller 216. The frame 500 is retained for further processing.

The monitoring controller 220, having received the frames 500 and 504, passes both frames 500 and 504 (e.g. after decryption and any other suitable MAC-layer processing) to the analyzer 224. As will now be apparent, neither of the frames 500 and 504 is addressed to the monitoring controller 220. The monitoring controller 220, in other words, is configured to operate in "promiscuous mode".

Thus, during the performance of blocks 315 and 320, the monitoring controller 220 is configured to receive substantially all data that is received by the operational controller, and to provide all received data to the analyzer 224 for one or more of storage in the memory 204, analysis, alert generation, or the like.

Returning to FIG. 3, at block 325 the operational controller 216 is configured to determine whether to initiate a roaming scan. As will be apparent to those skilled in the art, a roaming scan can be initiated in response to a variety of trigger conditions being satisfied. For example, if a received signal strength indicator (RSSI) corresponding to the access point 108 to which the device 104 is currently connected drops below a predefined threshold, the determination at block 325 may be affirmative.

When the determination at block 325 is negative, the operational controller 216 returns to block 315, and the performance of block 315 (as well as the performance of block 320 at the monitoring controller 220) continues. When the determination at block 325 is affirmative, however, the operational controller 216 is configured to initiate a roaming scan according to a suitable scanning technique, as will be understood by those skilled in the art. The roaming scan may include cycling through a plurality of channels to detect available access points 108 operating on such channels, for example via receipt of probe response messages, beacon messages and the like from the access points 108. The operational controller 216 obtains, as a result of the roaming scan, access point data corresponding to each detected access point. The access point data for each access point can include an access point identifier, an RSSI value, one or more channel identifiers indicating the channel(s) available for connection with the access point, and the like.

At block 330, the operational controller 216 is configured to send the access point data obtained through the roaming scan to the monitoring controller 220. In some examples, prior to performing the roaming scan, the operational controller 216 is configured to send a notification to the monitoring controller that a roaming scan is to be performed. As noted above, the roaming scan may involve cycling through a number of channel to collect the access point data. The monitoring controller 220, meanwhile, continues to monitor the current channel set at block 310. The monitoring controller 220 therefore has not obtained at least a portion of the access point data.

The monitoring controller 220 is configured, at block 335, to determine whether scan results (i.e. the above-mentioned access point data) have been received from the operational controller 216. When the determination is affirmative, the monitoring controller 220 is configured at block 340 to merge the scan results with the monitored data obtained through the performance of block 320, and then proceed to block 345. When the determination is negative, the monitoring controller 220 is configured to proceed directly to block 345.

Figure 5B:
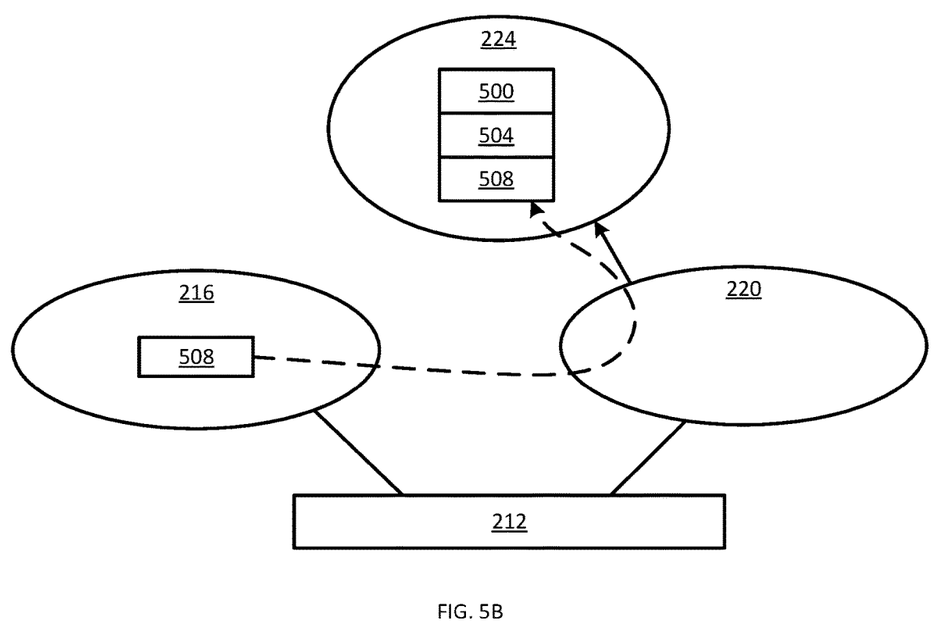
FIG. 5B depicts performances of blocks 330 and 340 of the method of FIG. 3.

Turning to FIG. 5B, an example performance of blocks 330 and 340 (following an affirmative determination at block 335) is illustrated. In particular, the operational controller 216 has obtained access point data 508 corresponding to a plurality of access points 108. The access point data 508 may include data obtained on the same channel as employed for the connection 400, and data obtained on other channels. The operational controller 216 is configured to pass the access point data 508 to the monitoring controller 220, which is in turn configured to pass the access point data 508 to the analyzer 224. As will now be apparent, the monitoring controller 220 may have obtained a portion of the access point data, through monitoring of the current channel. The monitoring controller 220 can therefore be configured, at block 340, to merge any partial access point data so obtained with the access point data 508. For example, the monitoring controller 220 can be configured to delete the partial access point data and employ only the data received from the operational controller 216. In other examples, the operational controller 216 can be configured to omit any access point data received on the channel corresponding to the active connection (e.g. the connection 400) from the transmission at block 330, and the monitoring controller 220 is configured to merge the partial data received from the operational controller 216 with partial data received at the monitoring controller 220 to recreate the access point data 508.

Returning to FIG. 3, at block 350 the operational controller 216 is configured to determine whether to initiate a handoff procedure, to migrate the connection established prior to block 305 (e.g. the connection 400 with the access point 108-1) to another access point 108. The determination at block 350 can be made based on the access point data obtained following an affirmative determination at block 325.

Figure 6:
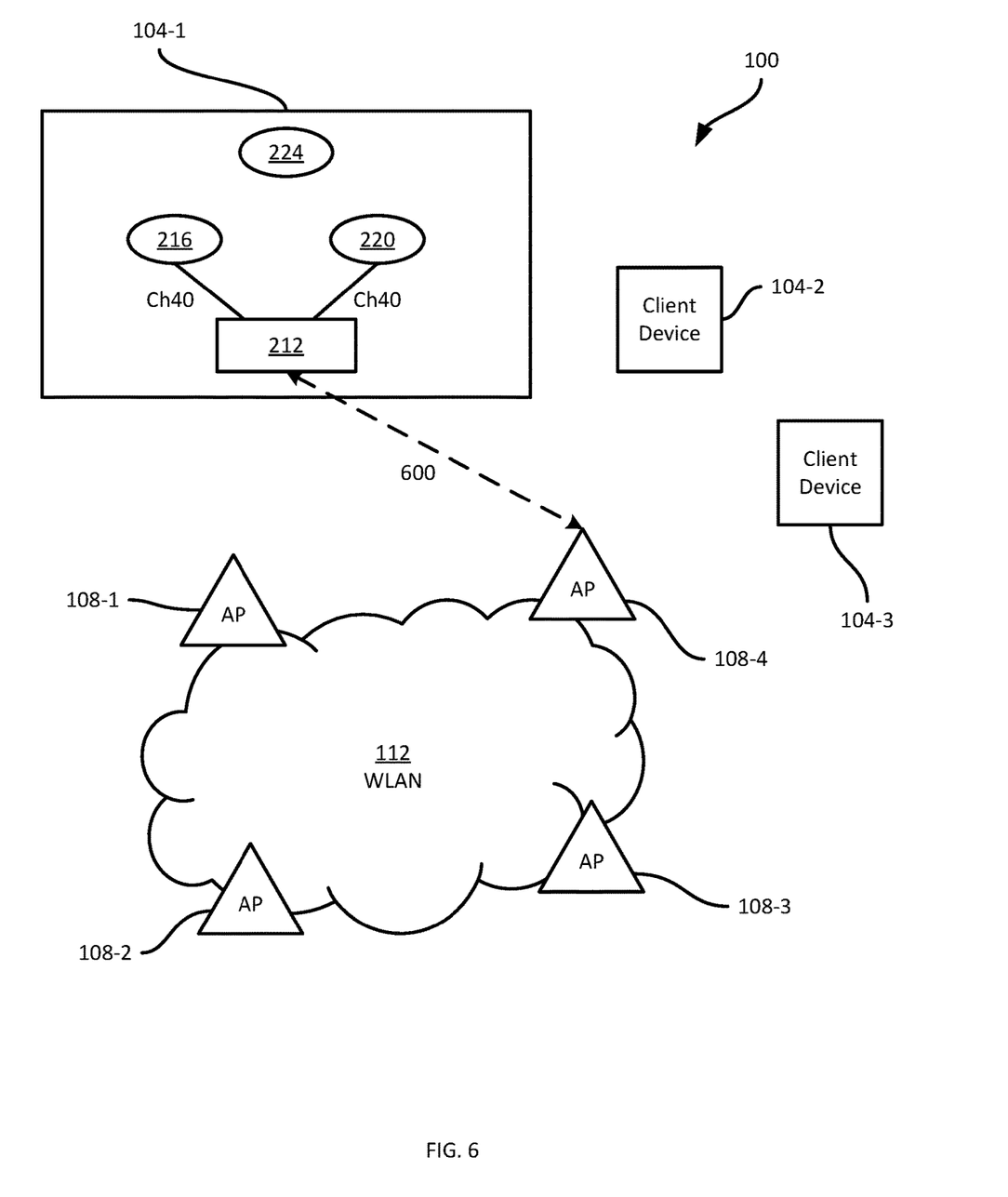
FIG. 6 depicts a performance of a connection handoff in the system of FIG. 1.

When the determination at block 350 is affirmative, the operational controller 216 is configured to initiate the handoff according to a suitable handoff mechanism (not discussed in detail herein), and to obtain new connection parameters at block 355. The new connection parameters include the channel identifier, access point identifier, encryption keys and the like for the migrated connection. Referring briefly to FIG. 6, the device 104-1 is illustrated after the performance of block 355. Specifically, the connection 400 has been replaced with a connection 600 with the access point 108-4, on the channel "Ch40".

Returning to FIG. 3, responsive to obtaining the new connection parameters at block 355, the operational controller 216 is configured to set the new connection parameters as current connection parameters, and to return to block 305. As will now be apparent, via another performance of block 305 (e.g. with a handoff indicator in the message to the monitoring controller 220), the new connection parameters are provided to the monitoring controller 220, which therefore updates the monitored channel. Specifically, at block 345 the monitoring controller 220 is configured to determine whether updated connection parameters have been received. When the determination at block 345 is negative, the monitoring controller 220 returns to block 320 to continue monitoring the current channel. When the determination at block 345 is affirmative, the monitoring controller 220 returns instead to block 310 to set the current channel for monitoring to the newly received channel identifier.

FIG. 6 illustrates the result of another performance of block 305 following establishment of the connection 600 (as well as another performance of block 310 by the monitoring controller 220). In particular, both the controllers 216 and 220 are configured to receive any frames detected by the communications interface 212 on the same channel (Ch40 in the present example).

The performance of the method 300 can continue as described above until the operational controller 216 receives a command (e.g. from the operating system of the device 104-1 or the like) to disconnect from the WLAN 112. When such a disconnect command is received, the operational controller 216 is configured to transmit the disconnect command to the monitoring controller 220 prior to tearing down the current connection. Responsive to receipt of the disconnect command, the monitoring controller 220 is configured to cease monitoring at block 320.

Figure 7:
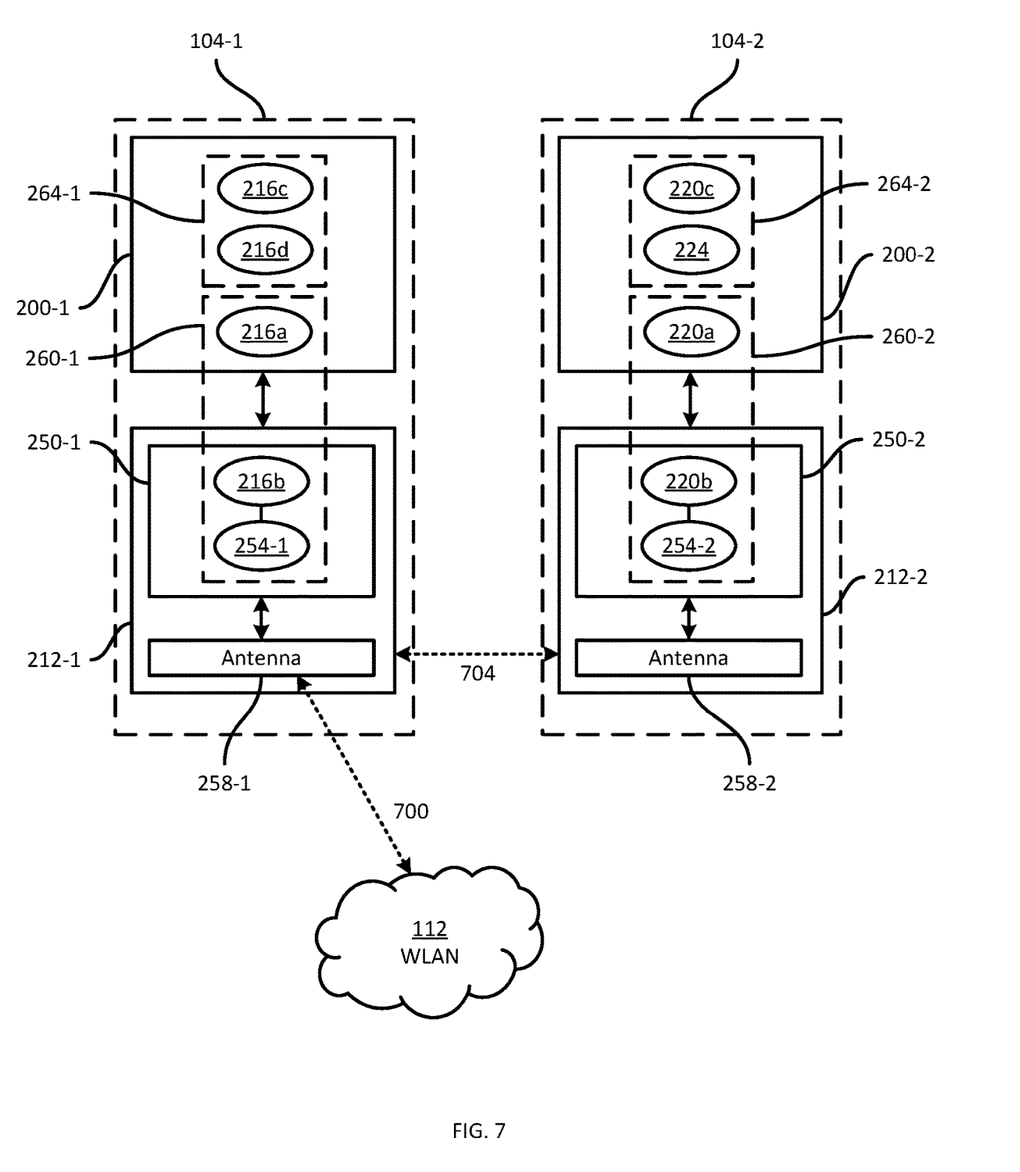
FIG. 7 is a block diagram of certain internal components of paired client devices in accordance with another embodiment.

Variations to the above systems and methods are contemplated. For example, in addition to the implementations of the controllers 216 and 220 mentioned above, in some embodiments the controllers 216 and 220 are implemented on distinct client devices 104. For example, each device 104 in the system 100 can be paired with a monitoring device. In such embodiments, the client devices 104 implement the operational controller 216 but the monitoring controller 220 is implemented by the paired devices. Inter-controller communications can be conducted via any suitable inter-device communications technology, such as Wi-Fi, Bluetooth™, a cabled connection (e.g. USB) and the like. The above-mentioned embodiment is illustrated in FIG. 7, in which the device 104-2 is paired with the device 104-1 and thus acts as a monitoring device for the device 104-1. The device 104-1 executes the application components 216a and 216b in the processor 200-1 and the controller 250-1 of the interface 212-1, respectively. The controller 250-1 also executes the transceiver application 254-1. The device 104-1 therefore implements the first, or operational, MAC layer 260-1 and the associated application layer 264-1 enabling communication with the WLAN 112 via the antenna 258-1 over a link 700.

As will be apparent from FIG. 7, the second, or monitoring, MAC layer 260-2, and the associated application layer 264-2 are implemented by the paired device 104-2 rather than the device 104-1. That is, the device 104-2 executes the application components 220a and 220b in the processor 200-2 and the controller 250-2 of the interface 212-1, respectively. The controller 250-2 also executes the transceiver application 254-2. In the present example, the MAC layers 260-1 and 260-2 have distinct MAC addresses.

Rather than communicating with the WLAN 112, the device 104-2 collects, via the antenna 258-2 and the application components 220a and 220b, transmissions on the same channel as the link 700. Such transmissions include both those on the link 700 itself and on other links (e.g. between the WLAN 112 and other devices 104). The control data exchanged by the applications 216 and 220 (e.g. at blocks 305 and 310, as well as blocks 330 and 340) can be exchanged, via the synchronization components 216c and 220c, over a link 704 (e.g. a Bluetooth™ link) between the devices 104-1 and 104-2.

As will now be apparent to those skilled in the art, the implementation of operational and monitoring controllers (e.g. via the structures shown in FIG. 2B and FIG. 7, or via other suitable deployments of the functional components noted above) configured to exchange data permits the monitoring controller to implement similar operational parameters as the operational controller. By implementing similar operational parameters, the monitoring controller may more effectively collect data relevant to the performance of the operational controller (e.g. on the same wireless channel), while mitigating or eliminating performance impacts on the operational controller. Further, the implementation of the monitoring controller in a paired device, or in the same device as the operational controller, may increase the likelihood of the data collected by the monitoring controller accurately reflecting a perspective of the operational controller (e.g. imposed by the housing of the devices, the position of the devices within the facility, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system for monitoring wireless communications in a client device having a wireless communications interface, comprising:
    an analyzer;
    a monitoring controller implementing (i) a monitoring media access control (MAC) layer coupled to the analyzer and (ii) a monitoring synchronizer associated with the monitoring MAC layer;
    an operational controller of the client device coupled to the wireless communications interface and implementing (i) an operational MAC layer, (ii) an operational synchronizer associated with the operational MAC layer, and (iii) a control component placing the operational MAC layer in a connected mode;
    the operational controller configured to:
        control the wireless communications interface to establish a wireless connection with an access point according to a set of connection parameters including a channel identifier indicating a channel employed for the wireless connection; and
        transmit the set of connection parameters via the operational synchronizer to the monitoring synchronizer of the monitoring controller;
    the monitoring controller configured, responsive to receiving the connection parameters from the operational controller, to:
        monitor the channel corresponding to the channel identifier to obtain a plurality of frames transmitted over the channel; and
        provide the plurality of frames to the analyzer.

2. The system of claim 1, wherein the client device comprises a processor configured to implement the operational controller via execution of an operational control application.

3. The system of claim 2, wherein the processor of the client device is further configured to implement the monitoring controller via execution of a monitoring control application.

4. The system of claim 3, wherein the processor of the client device is further configured to implement the analyzer via execution of an analyzer application.

5. The system of claim 4, wherein each of the monitoring control application and the analyzer application include respective synchronization components configured to exchange the set of connection parameters.

6. The system of claim 1, further comprising:
    a paired client device including the monitoring controller and the analyzer.

7. The system of claim 1, wherein the operational controller is further configured, responsive to performing a roaming scan to obtain access point data, to transmit the access point data to the monitoring controller.

8. The system of claim 1, wherein the operational controller is further configured, responsive to initiating a connection handoff, to:
    obtain updated connection parameters; and
    transmit the updated connection parameters to the monitoring controller.

9. The system of claim 8, wherein the monitoring controller is further configured to:
    responsive to receiving the updated connection parameters, initiate monitoring of an updated channel corresponding to the updated connection parameters.

10. A method for monitoring wireless communications in a client device having a wireless communications interface, comprising:
    at an operational controller of the client device coupled to the wireless communications interface and implementing (i) an operational media access control (MAC) layer, (ii) an operational synchronizer associated with the operational MAC layer, and (iii) a control component:
        via the control component, placing the operational MAC layer in a connected mode for controlling the wireless communications interface to establish a wireless connection with an access point according to a set of connection parameters including a channel identifier indicating a channel employed for the wireless connection; and
        transmitting the set of connection parameters from the operational controller via the operational synchronizer to a monitoring controller implementing (i) a monitoring layer coupled to an analyzer and (ii) a monitoring synchronizer associated with the monitoring MAC layer;

at the monitoring controller, responsive to receiving the connection parameters from the operational controller via the monitoring synchronizer, monitoring the channel corresponding to the channel identifier to obtain a plurality of frames transmitted over the channel; and providing the plurality of frames from the monitoring controller to the analyzer.

11. The method of claim 10, further comprising: executing an operational control application at a processor of the client device to implement the operational controller.

12. The method of claim 11, further comprising: executing a monitoring control application at the processor of the client device to implement the monitoring controller.

13. The method of claim 12, further comprising: executing an analyzer application at the processor of the client device to implement the analyzer.

14. The method of claim 13, wherein each of the monitoring control application and the analyzer application include respective synchronization components configured to exchange the set of connection parameters.

15. The method of claim 10, further comprising: executing the monitoring controller and the analyzer at a paired client device.

16. The method of claim 10, further comprising, at the operational controller:

responsive to performing a roaming scan to obtain access point data, transmitting the access point data to the monitoring controller.

17. The method of claim 10, further comprising, at the operational controller responsive to initiating a connection handoff:

obtaining updated connection parameters; and transmitting the updated connection parameters to the monitoring controller.

18. The method of claim 17, further comprising, at the monitoring controller:

responsive to receiving the updated connection parameters, initiate monitoring of an updated channel corresponding to the updated connection parameters.

19. A non-transitory computer readable medium storing computer-readable instructions for execution by a processor of a client device for:

at an operational controller of the client device coupled to the wireless communications interface and implementing (i) an operational media access control (MAC) layer, (ii) an operational synchronizer associated with the operational MAC layer, and (iii) a control component:

via the control component, placing the operational MAC layer in a connected mode for controlling the wireless communications interface to establish a wireless connection with an access point according to a set of connection parameters including a channel identifier indicating a channel employed for the wireless connection; and transmitting the set of connection parameters from the operational controller via the operational synchronizer to a monitoring controller implementing (i) a monitoring layer coupled to an analyzer and (ii) a monitoring synchronizer associated with the monitoring MAC layer;

at the monitoring controller, responsive to receiving the connection parameters from the operational controller via the monitoring synchronizer, monitoring the channel corresponding to the channel identifier to obtain a plurality of frames transmitted over the channel; and providing the plurality of frames from the monitoring controller to the analyzer.

* * * * *